United States Patent [19]

Sawicki et al.

[11] Patent Number: 4,586,945
[45] Date of Patent: May 6, 1986

[54] DUAL CONTROL BURNER MANIFOLD FOR CRT PRODUCTION

[75] Inventors: Frank S. Sawicki, Scranton; Mark D. Mital, Hughestown; Francis J. Osborne, Archbald, all of Pa.

[73] Assignee: RCA Corporation, Princeton, N.J.

[21] Appl. No.: 653,075

[22] Filed: Sep. 21, 1984

[51] Int. Cl.$^4$ .............................................. C03B 23/07
[52] U.S. Cl. .......................................... 65/138; 65/36; 65/59.1; 65/154
[58] Field of Search ............... 445/66; 65/36, 65, 138, 65/104, 105, 120, 113, 154, 252, 284, 285; 431/12

[56] References Cited

U.S. PATENT DOCUMENTS

| | | | |
|---|---|---|---|
| 2,296,579 | 9/1942 | Seelen | 65/41 |
| 3,268,317 | 8/1966 | Blust | 65/138 |
| 3,292,855 | 12/1966 | Wright | 431/12 |
| 4,165,227 | 8/1979 | Nubani et al. | 65/113 |

FOREIGN PATENT DOCUMENTS

| | | | |
|---|---|---|---|
| 345286 | 12/1921 | Fed. Rep. of Germany | 65/284 |
| 23730 | 2/1979 | Japan | 65/13 |

OTHER PUBLICATIONS

"Glass to Metal Seals", Partridge et al., 1950, pp. 94-100, 109, 110.

Primary Examiner—S. Leon Bashore
Assistant Examiner—Michael K. Boyer
Attorney, Agent, or Firm—E. M. Whitacre; D. H. Irlbeck; T. H. Magee

[57] ABSTRACT

An apparatus for sealing a wafer in the neck of a CRT has two groups of burners, one group provides the optimum temperature for sealing, the other group provides the optimum temperature for cutting off the cullet. The burners are arranged in an arc with the outer burners performing the cutting off operation and the inner burners performing the sealing operation.

1 Claim, 2 Drawing Figures

DUAL CONTROL BURNER MANIFOLD FOR CRT PRODUCTION

BACKGROUND OF THE INVENTION

The present invention relates to apparatus for heating and sealing glass, and more particularly to a burner manifold with dual gas and temperature controls for use in sealing a wafer in a CRT (cathode ray tube) neck.

A CRT comprises three major sections, namely a panel, a funnel, and a neck. The neck comprises at its end remote from the panel an electron gun that is mounted on a wafer with lead wires for the gun electrodes projecting through the wafer. Surrounding the lead wires at the wafer are round portions of glass called "fillets" to provide a better seal around the lead wires.

During manufacture, the CRT is held in the vertical panel-up position, and the wafer with the gun mounted thereon is upwardly inserted into the neck. Heat from burners is then applied to the outside of the neck proximate the wafer, i.e., at the "seal plane", and the CRT and the wafer are rotated about their vertical central axes so that the neck softens, thins and then seals to the wafer. Also excess neck material that is lower than the wafer (cullet) is cut off and therefore falls away from the neck. However, the optimum temperature for softening is not the same as that for cutting. Thus a compromise temperature of about 950° C. is used.

However, if for any reason the axis of the gun does not match the axis of the neck, or if the plane of the burners does not substantially match that of the wafer, then an incomplete cullet cut-off resulting in excess glass material called a "hanger" can be produced. The normal response of a production worker is to increase the temperature of the burners to achieve a better cut-off. Unfortunately, this can result in a "hot seal", where a portion of the inside of the neck glass melts and forms a sharp angle called a "reentrancy" with one or more of the fillets. Such reentrancies are stress concentration points that can result in a break in the wafer (called a "cracked stem" or "cracked seal"). Other problems with a hot seal include creating a burn hole, so that evacuation of air from the CRT is not possible during a subsequent pump-down operation, and creating an excessively thin region of the neck glass, which region can be easily broken.

The present invention overcomes the above problems.

SUMMARY OF THE INVENTION

Apparatus for sealing a wafer in the neck of a cathode ray tube and for cutting off excess neck material comprises a plurality of burners divided into two groups. The first group has a higher temperature than the second group. Also, the first group is aimed slightly below said wafer, while the second group is aimed at said wafer. Thus, the first group of burners cuts off excess neck material, while the second group seals the neck to the wafer.

DETAILED DESCRIPTION

Figure 1:
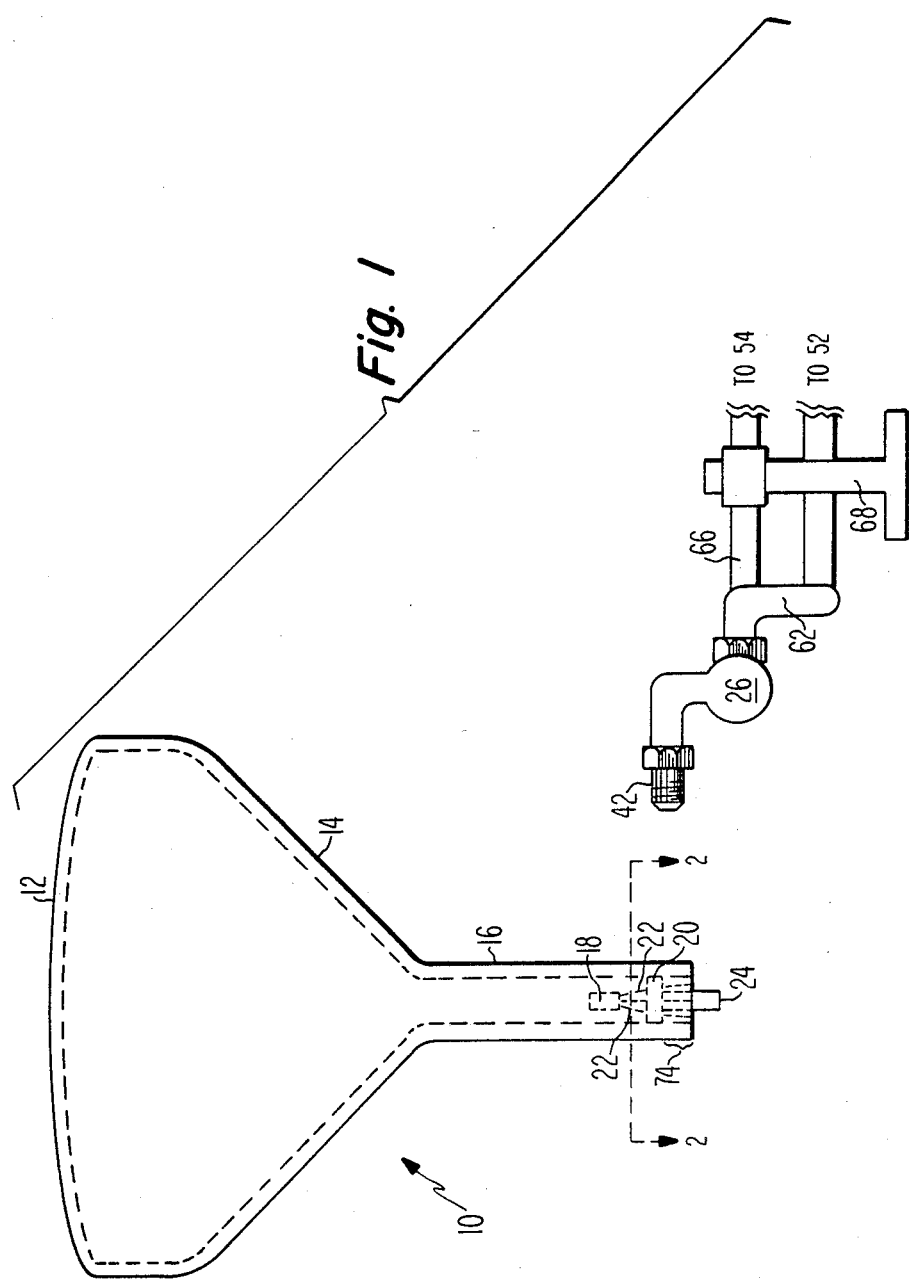
FIG. 1 is a side view showing apparatus in accordance with the invention.
Figure 2:
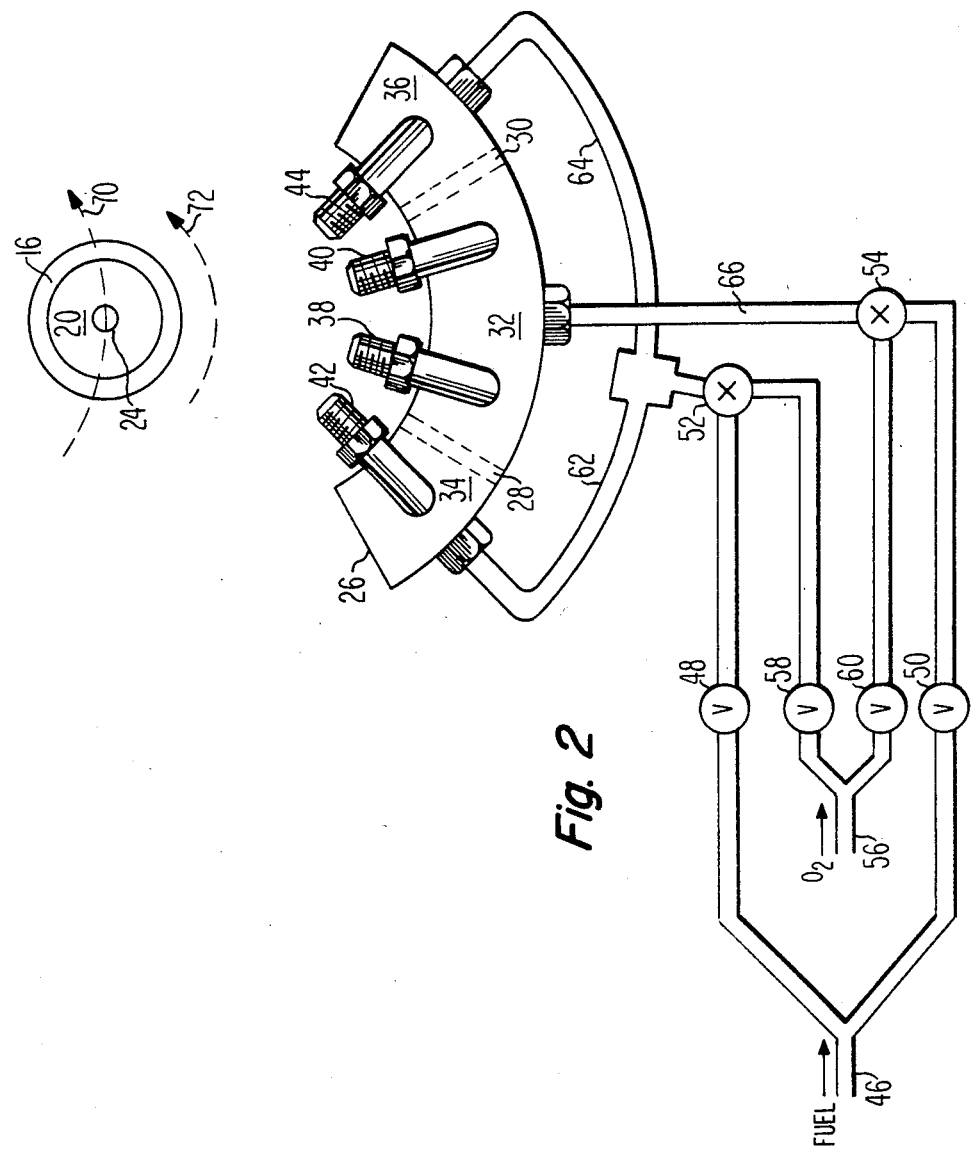
FIG. 2 is a top view of the apparatus, partly in cross-section, along the line 2—2 of FIG. 1.

FIG. 1 shows a CRT assembly 10 comprising a panel 12, a funnel 14, and a neck 16, all made of glass. As known in the art, the CRT assembly 10 is supported by a carrousel (not shown) that rotates the CRT assembly 10 among successive mount sealing stations, one of which, the wafer sealing and cullet cut-off station, is shown in FIGS. 1 and 2. In the neck 16 is disposed an electron gun 18 mounted on a wafer 20 by a plurality of leads 22 that project through the wafer 20. In the center of the wafer 20 is a tubulation 24 that is supported by a spindle (not shown), as is conventional.

FIG. 2 best shows a burner in accordance with the invention. A manifold 26 has a pair of partitions 28 and 30 so that it is divided into a central chamber 32, and a pair of outside chambers 34 and 36. Communicating with the central chamber 32 are a pair of inner burners 38 and 40; and communicating with the outside chambers 34 and 36 are outer burners 42 and 44, respectively. The inner burners 38 and 40 preferably are aimed so that their flames perpendicularly impact the neck 16 at the sealing plane, for best sealing action. On the other hand, the outer burners 42 and 44 preferably are aimed so that their flames tangentially impact the neck 16 slightly below the sealing plane, for best cutting action. The burners are arrayed in an arc, which has an angle of 60 degrees, with a range of from 60 to 90 degrees being typical.

Fuel, such as natural gas, is received by a pipe 46 and provided to adjustable valves 48 and 50 and then to mixers 52 and 54. Oxygen is received by a pipe 56 and provided to adjustable valves 58 and 60 and then to the mixers 52 and 54. The mixers 52 and 54 mix the fuel and oxygen to form combustible gas mixtures. The combustible gas mixture from the mixer 52 is provided by pipes 62 and 64 to the outside chambers 34 and 36, respectively. Thus the burners 42 and 44 comprise a first group of burners providing the same temperature since they have the same gas mixture applied thereto. The combustible gas mixture from the mixer 54 is applied by a pipe 66 to the central chamber 32. Thus the inner burners 38 and 40 comprise a second group of burners. A stand 68 (shown only in FIG. 1) is used to support the pipe 66 and the manifold 26 with its associated burners 38, 40, 42 and 44. The height of the stand 68 is selected to assure that the flames from the burners 38 and 40 are essentially at the sealing plane.

In operation, the burners 38, 40, 42, and 44 are ignited. The valves 48 and 58 are adjusted so that the first group of burners 42 and 44 provide an optimum temperature (about 975° C. at the neck 16) for cutting. The valves 50 and 60 are adjusted so that the second group of burners 38 and 40 provide an optimum temperature (about 925° C. at the neck) for sealing. These temperatures are optimum for type EG-20 glass manufactured by Owens-Illinois Co. and type 0137 glass manufactured by Corning Glass Works and for a wall thickness of the neck 16 of 0.090 inches (2.286 mm). In general, greater oxygen sharpens the flame for a better cutting action, while less oxygen broadens the flame for better sealing. The nozzle shape of the burners 38, 40, 42, and 44 can also be selected to provide a desired flame shape. The CRT assembly 10 is rotated by the carrousel (not shown) into the wafer sealing and cullet cut-off station as shown by an arrow 70 in FIG. 2. About 19 seconds are available at each station. Means (not shown) are provided on the carrousel to rotate the CRT assembly 10 about its central vertical axis as shown by an arrow 72. The spindle (not shown) holding the tubulation 24 and hence the wafer 20 is also rotating at the same rate as the CRT assembly 10, which is about nine rotations per station. As the CRT assembly 10 and the wafer 20 rotate, sealing of the neck 16 to the wafer is done by the second group of burners 38 and 40, while cut-off of the cullet 74 is done by the first group of burners 42 and 44. Since each group has the optimum temperature for the operation it performs, no hangers result, and therefore the operator will not increase the temperature of any of the burners. This eliminates hot seals and the problems resulting therefrom. The CRT 10 is then rotated by the carrousel to the next station.

What is claimed is:

1. An apparatus for sealing a wafer in the neck of a cathode ray tube and for cutting off excess neck material, said apparatus comprising
   a plurality of burners having first and second groups, said first and second groups being aimed below said wafer and at said wafer respectively, and being connected to means for providing separate first and second combustible gas mixtures to said first and said second groups, respectively, said burners being disposed in an arc wherein the outer burners comprise said first group and the inner burners comprise said second group, and
   a manifold having a pair of partitions forming a central chamber of said manifold and two outside chambers of said manifold, said outside chambers respectively providing said first combustible gas mixture to said outer burners, said central chamber providing said second combustible gas mixture to said inner burners.

* * * * *